United States Patent
Chaney

[11] 3,738,756
[45] June 12, 1973

[54] MAGNETO-OPTIC ROTATION ANALYZER
[75] Inventor: Robert L. Chaney, Cupertino, Calif.
[73] Assignee: Hewlett-Packard Company, Palo Alto, Calif.
[22] Filed: July 12, 1971
[21] Appl. No.: 161,846

[52] U.S. Cl.................. 356/117, 250/225, 350/149
[51] Int. Cl. ............................................ G03b 27/22
[58] Field of Search........................... 356/114, 117; 250/225

[56] References Cited
UNITED STATES PATENTS
3,442,592  5/1969  Grosjean.......................... 356/114 X
3,450,477  6/1969  Meltzer.............................. 356/114
3,510,226  5/1970  Cary .................................. 356/117

Primary Examiner—John K. Corbin
Attorney—Roland I. Griffin

[57] ABSTRACT

In a magneto-optic rotation analyzer, a first modulator modulates the magneto-optic rotation, if any, of the probing light beam by the sample at a first modulation frequency and a second reference modulator, independent of the sample, modulates the polarization of the probing light beam at a second reference modulation frequency. Both modulators produce separate modulation components in the output of the photo-multiplier employed to detect the polarization affected probing light beam. The separate sample and reference modulation signal components are separately detected and integrated. The reference signal is utilized to compensate for variations in the parameters of the optical components through the optical path of the analyzer.

8 Claims, 5 Drawing Figures

INVENTOR
ROBERT L. CHANEY
BY Roland J. Griffin
ATTORNEY

INVENTOR
ROBERT L. CHANEY
BY Roland I. Griffin
ATTORNEY

MAGNETO-OPTIC ROTATION ANALYZER

RELATED CASES

Use of synchronous detection in a magneto-optic rotation molecular analyzer is disclosed and claimed in copending U.S. patent application Ser. No. 162,602, filed July 14, 1971 and assigned to the same assignee as the present invention.

DESCRIPTION OF THE PRIOR ART

Heretofore, magneto-optic rotation monochromator or light filter experiments have been disclosed wherein the polarized probing light beam has been shown through a known sample immersed in a magnetic field to obtain magneto-optic rotation of the probing light beam. The emerging light beam was polarization analyzed to separate the rotated light from the unrotated light and thence fed through an extremely narrow band optical filter and to a photodetector. The magnetic field was modulated within the sample to produce a modulation of the magneto-optic rotation signal in the output of the detector. Such a magneto-optic experiment is disclosed in an article titled, "Modulation and Filtration of Resonance Radiation With The Use Of The Faraday Effect," appearing in Optics and Spectroscopy, Volume 19, No. 3, pages 254–255, of Sept., 1965. While this monochromator of the prior art is useful for examining magneto-optic rotation near the edges of a relatively narrow intense spectral line, it is not useful as an analyzer for determining the amount of trace quantities of constituents of fluid samples, such as gas or liquid samples, where the signal-to-noise ratio is orders of magnitude below the signal-to-noise ratio in the aforementioned prior art experiment. Moreover, the prior art monochromator has no means for compensating for variations in the lamp intensity, window transmission, background absorption, particle scattering, or changes in the gain of the photomultiplier detector.

SUMMARY OF THE PRESENT INVENTION

The principal object of the present invention is the provision of an improved magneto-optic rotation analyzer.

One feature of the present invention is the provision, in a magneto-optic rotation analyzer, of rotating the polarization of the probing light beam at a reference modulation frequency to produce a reference modulation signal component in the composite detected signal, such reference signal being independent of the magneto-optic rotation of the probing light beam produced by the sample under analysis, whereby the reference signal may be employed as a standard to compensate for variations in the optics and electronics of the analyzer.

In another feature of the present invention the reference modulation signal component is extracted from the composite detected electrical signal, integrated and when the integrated reference signal output reaches a predetermined level, a measurement is caused to be made of the similarly separated and the integrated magneto-rotation signal component, whereby the measurements which are made of the magneto-optic rotation signal are free of variations caused by variations of the probing light intensity, and of various transmission coefficients through components of the optical system including variations in the gain of the photomultiplier detector.

In another feature of the present invention, an optical filter is provided in the path of the light beam, such optical filter having a passband of optical frequencies encompassing substantially only the magneto-optic rotation spectrum of a component of the sample to be detected and selecting the level that the measured reference signal component must attain before a measurement of the magneto-optic rotation signal is made, such level being selected in accordance with the spectral bandwidth of the filter.

In another feature of the present invention, the amplitude of the reference polarization rotation is varied in accordance with the magneto-optic rotation spectrum bandwidth of the component to be detected and in accordance with the expected concentration range of the component to be detected in the sample.

Other features and advantages of the present invention will become apparent upon a perusal of the following specification taken in connection with the accompanying drawings wherein:

DESCRIPTION OF THE PREFERRED EMBODIMENTS

Figure 1:
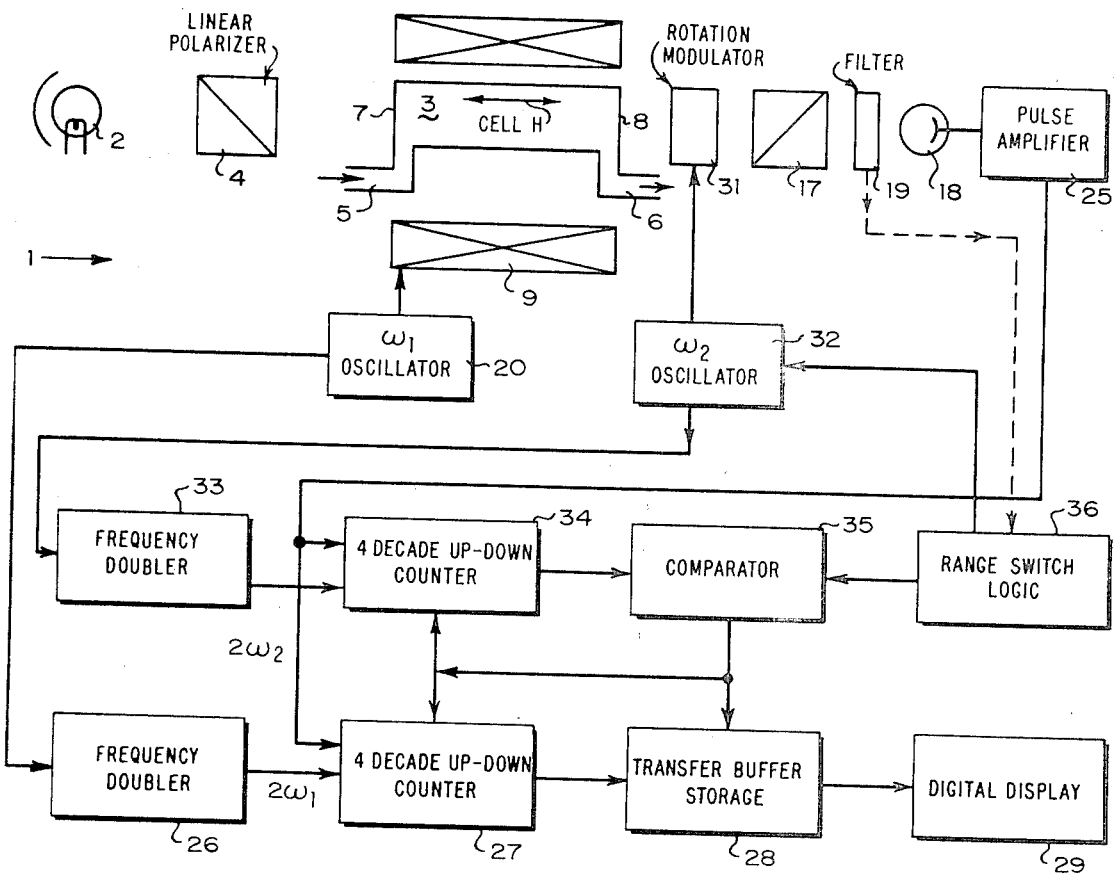
FIG. 1 is a schematic diagram, partly in block diagram form, depicting a magneto-optic rotation analyzer incorporating features of the present invention.
Figure 2:
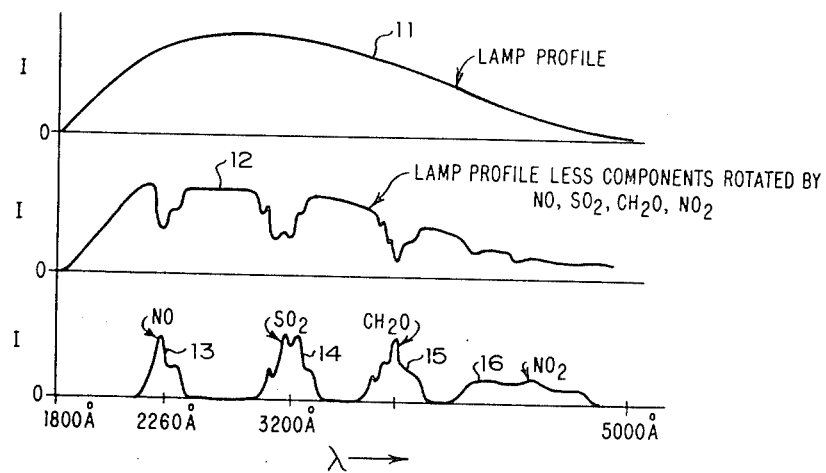
FIG. 2 is a plot of light intensity I versus wavelength in angstroms for three separate quantities, namely, lamp spectral profile, lamp spectral profile less components polarization rotated by certain constituents, and magneto-optic rotation spectra for the aforementioned components.
Figure 3:
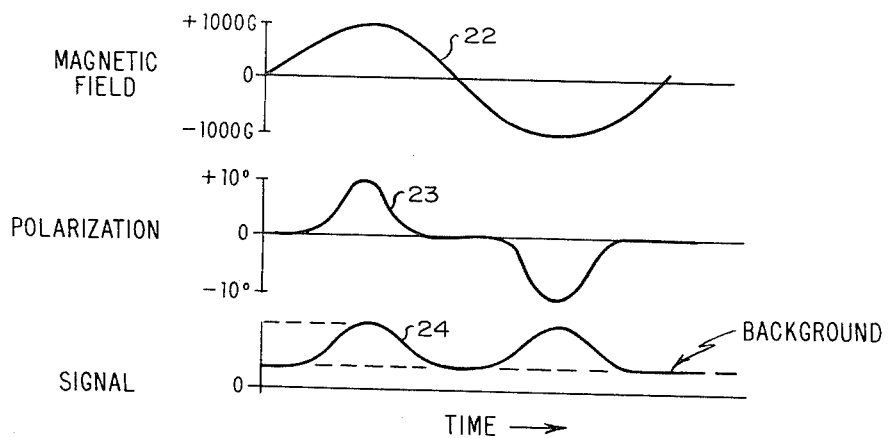
FIG. 3 is a plot of magnetic field, polarization, and signal amplitude versus time depicting the waveforms for the aforementioned quantities.

Referring now to FIGS. 1, 2 and 3, there is shown the magneto-optic rotation analyzer 1 incorporating features of the present invention. The analyzer 1 includes a lamp 2, such as a deuterium lamp, for forming and projecting a probing light beam into and through a sample cell 3 containing a sample of matter to be investigated. A linear polarizer 4, such as a Glan-Taylor prism, is disposed between the lamp 2 and the cell 3 for linearly polarizing the probing light beam in a first direction, such as in the vertical direction.

A fluid to be analyzed, such as air, containing sample constituents, such as NO, $SO_2$, $CH_2O$, $NO_2$, etc., is caused to flow through the sample cell 3 via inlet and outlet tubes 5 and 6, respectively. The sample cell 3 has optically transparent windows 7 and 8, as of quartz sealing opposite ends of the cell 3, which is formed by a stainless steel bobbin.

A solenoid 9 is wound on the outside of the bobbin to produce a magnetic field H, as of ±1,000 gauss, directed along the path of the light beam passing through the cell 3 to effect magneto-optic rotation of the polarization of the probing light within certain spectral bands dependent upon the nature of the sample constituents within the cell 3. More specifically, the lamp 2 has a lamp profile shown by curve 11 of FIG. 2. As the polarized light passes through the cell 3, the various sample constituents, such as NO, $SO_2$, $CH_2O$, $NO_2$ produce a rotation of the plane of the polarization of the light from the first polarization to a second polarization. The lamp profile less the components rotated by the gases is shown by curve 12 of FIG. 2. The magneto-optic rotation spectra for the aforementioned components are indicated at 13, 14, 15 and 16, respectively in FIG. 2.

The probing light beam emerging from the sample is then passed through a polarization analyzer 17, such as a linear polarizer similar to polarizer 4 but oriented to pass light rotated 90° with regard to the polarization of the light passing through the input linear polarizer 4. Thus, the polarization analyzer 17 serves to separate the magneto-optic rotation spectra 13 – 16 of FIG. 2 from that portion of the light which retains the original polarization, as indicated by the lamp profile spectrum 12 of FIG. 2. In the preferred embodiment of the present invention the polarization of polarizer 17 is set so that the magneto-optic rotation spectra pass through the linear polarizer 17 to a photomultiplier 18 for detection. However, the same magneto-optic rotation spectra information contained in the spectra 13 – 16 is also contained in the lamp profile of 12. Therefore, the polarization analyzer 17 may also be set with the same polarization as the input polarizer 4 such that the lamp profile signal 12 is passed to the detector 18.

An optical filter 19, such as a thin film filter, is disposed between the polarization analyzer 17 and the photomultiplier 18 for passing to the photomultiplier 18 essentially only a selected one of the magneto-optic rotation spectra to be observed. More particularly, if it was desired to detect NO components in the sample cell 3, the thin film filter 19 would be constructed with a 30 angstrom passband centered at 2,260 angstroms. To detect the $SO_2$ component, filter 19 would be constructed with a 200 angstrom passband centered at 3,200 angstroms. To detect $NO_2$, filter 19 is constructed with a bandpass of 1,000 angstroms centered at 4,500 angstroms.

The magnetic solonoid 9 is energized with an alternating current of frequency $\omega_1$, as of 270 Hz, derived from power oscillator 20 to produce modulation of the magneto-optic rotation of the polarization at twice the frequency of the applied alternating magnetic field, namely at $2\omega_1$. This produces a modulation signal component in the composite output electrical signal from the photomultiplier 18. The composite output signal 24 is fed to the input of a pulse amplifier 25.

Actually, instead of the signal 24 having a continuous waveform as indicated in FIG. 3, a closer examination of the output signal from the photomultiplier 18 shows that it consists of a series of very short pulses, as of 45 nanoseconds pulse width, at repetition rate from 104 per second to 100 million per second depending upon the number of photons in the light beam reaching the photomultiplier detector 18. At very low concentrations, ranges of the sample constituent being detected, such as 0.01 parts per million, the pulses due to the magneto-optic rotation effect of the sample constituents may be as low as 100 per second, whereas the background noise produced by cosmic rays in the photomultiplier 18 may be on the order of 104 pulses per second.

The pulse amplifier 25 preferably has a log amplification characteristic such that low amplitude pulses are amplified much more than high amplitude pulses. In this manner, the output of the pulse amplifier 25 consists of a train of pulses all of approximately the same amplitude and pulse width. counter.

The composite output of the pulse amplifier 25 is synchronously detected against a reference signal derived from the magneto-optic rotation modulator for separating the magneto-optic rotation signal from the noise. More particularly, the reference output from the $\omega_1$ oscillator 20 is fed to a frequency doubler 26 wherein it is doubled to obtain the $2\omega_1$ reference fed to a count control channel of a 4 decade up-and-down counter 27 which is connected to the output of the pulse amplifier 25 for counting the pulses supplied to the counter. The $2\omega_1$ control signal causes the counter to count up during the half cycle of the reference, corresponding to when the magneto-optic rotation signal is present and to count down on the next half cycle of the reference signal when the magneto-optic rotation signal 24 is not present and corresponds essentially only to the background noise signal. In this manner, the background noise signal is subtracted from the magneto-optic rotation signal. The up-down counter 27 serves also to integrate the magneto-optic rotation signal as the count continues and the integrated count is transferred to a transfer buffer storage 28 and periodically transferred to a digital display 29 to obtain a digital readout of the amount of the selected sample constituent to be detected within the sample cell 3.

Variations in the intensity of the lamp 2, the gain of the photomultiplier 18 and the transmission through various components in the optical system of the molecular analyzer 1 are cancelled out by means of a reference channel. The reference channel includes the provision of a polarization rotation modulator 31 in the path of the light beam intermediate the lamp 2 and the photomultiplier 18 for modulating the rotation of the polarization of the probing light at a reference frequency $\omega_2$, as of 50 kHz. In a typical example, the rotation modulator comprises a photoelastic modulator 31 such as a fractional wave plate of quartz. Such a wave plate is commercially available from Morvue of Tigard, Oreg. The rotation modulator 31 is excited from an $\omega_2$ oscillator 32. For the reasons as above recited relative to the magnetic field modulation of the polarization of the light with regard to FIG. 3 such reference frequency modulation of the polarization produces a $2\omega_2$ reference signal component in the output of the photomultiplier 18 and pulse amplifier 25. The reference rotation modulation produced in the light beam is independent of the magneto-optic rotation within the sample cell 3, such that the reference signal will be present whether or not a sample material is in the cell 3. Moreover, the reference signal produced in the photomultiplier 18 and amplified by the pulse amplifier 25 will vary in the same manner as the magneto-optic rotation signal with variations in the parameters of the analyzer which are independent of the sample.

The reference signal is separated from the composite signal in the output of the photomultiplier and pulse amplifier in essentially the same manner as the magneto-optic rotation signal is separated from the composite signal. More particularly, a reference signal at $\omega_2$ is fed from reference oscillator 32 to a frequency doubler 33 to produce a $2\omega_2$ reference fed to the count control channel of a second 4 decade up-down counter 34. The composite output of the pulse amplifier 25 is fed to the counting channel of the counter 34 to be counted up and down against the reference $2\omega_2$ in the same manner as previously described with regard to the counter 27 to separate and integrate the reference signal component from the composite electrical signal. The output of the counter 34 is fed to a comparator 35 for comparison against a reference signal derived from a range switch logic unit 36, such that when the count in the counter 34 reaches a certain predetermined level as determined by the input from the range switch logic 36, an output of the comparator is fed to transfer buffer storage 28 for transferring the separated and integrated count of the magneto-optic rotation signal to the display 29. Another output of the comparator 35 is fed to both counters 34 and 27 to discharge the count therein and to start a new count cycle.

The output from the range switch logic 36 which determines the level to which the reference counter 34 will count before the output of the magneto-optic rotation signal channel is transferred to the digital display, is a function of the intensity of the light which reaches the photomultiplier 18. This depends upon the width of the optical passband filter 19 and the intensity of lamp 2, which is for example $10^{12}$ photons per second. Thus, each separate filter 19 has information thereon which is fed into the range switch logic 36 for adjusting the amplitude of the detected reference signal by varying the gain or the power output of the $\omega_2$ oscillator 32 to vary accordingly the amplitude of the reference rotational modulation of the light beam passing to the photomultiplier 18. This information may be a binary code, analog input value of resistors, or merely printed such that the operator can set controls in the range switch logic 36.

In a typical example, it is desired that $10^7$ reference signal photons be counted by decade counter 34 before transfer of the magneto-optic rotation signal to the display 29 and that this number of reference photons be comparable to the number of signal photons to be counted by counter 27 before a measurement of the magneto-optic rotation signal is obtained. Thus, when measuring extremely low concentrations of a certain sample constituent in a cell 3, the magneto-optic rotation signal will have a very low pulse repetition rate in the output of the photomultiplier 18 and in order for the reference signal pulse rate to be comparable, the power to the reference rotation modulator 31 must be reduced by reducing the power output of reference oscillator 32, thereby reducing the degree of polarization modulation of the probing light beam. This feature is more fully described below with regard to FIGS. 4 and 5.

The magneto-optic rotation analyzer 1 of FIG. 1 is calibrated by flowing a pure carrier gas, such as nitrogen or air, through the cell 3 and leaking a gas to be detected at a known rate into the gas stream through a gas premeation tube to obtain an accurately known concentraion of the gas to be detected in the carrier stream. The digital display 29 is then calibrated in terms of the known concentration. The system is thus calibrated for subsequent measurements of that gaseous constituent in unknown concentrations.

Figure 4:
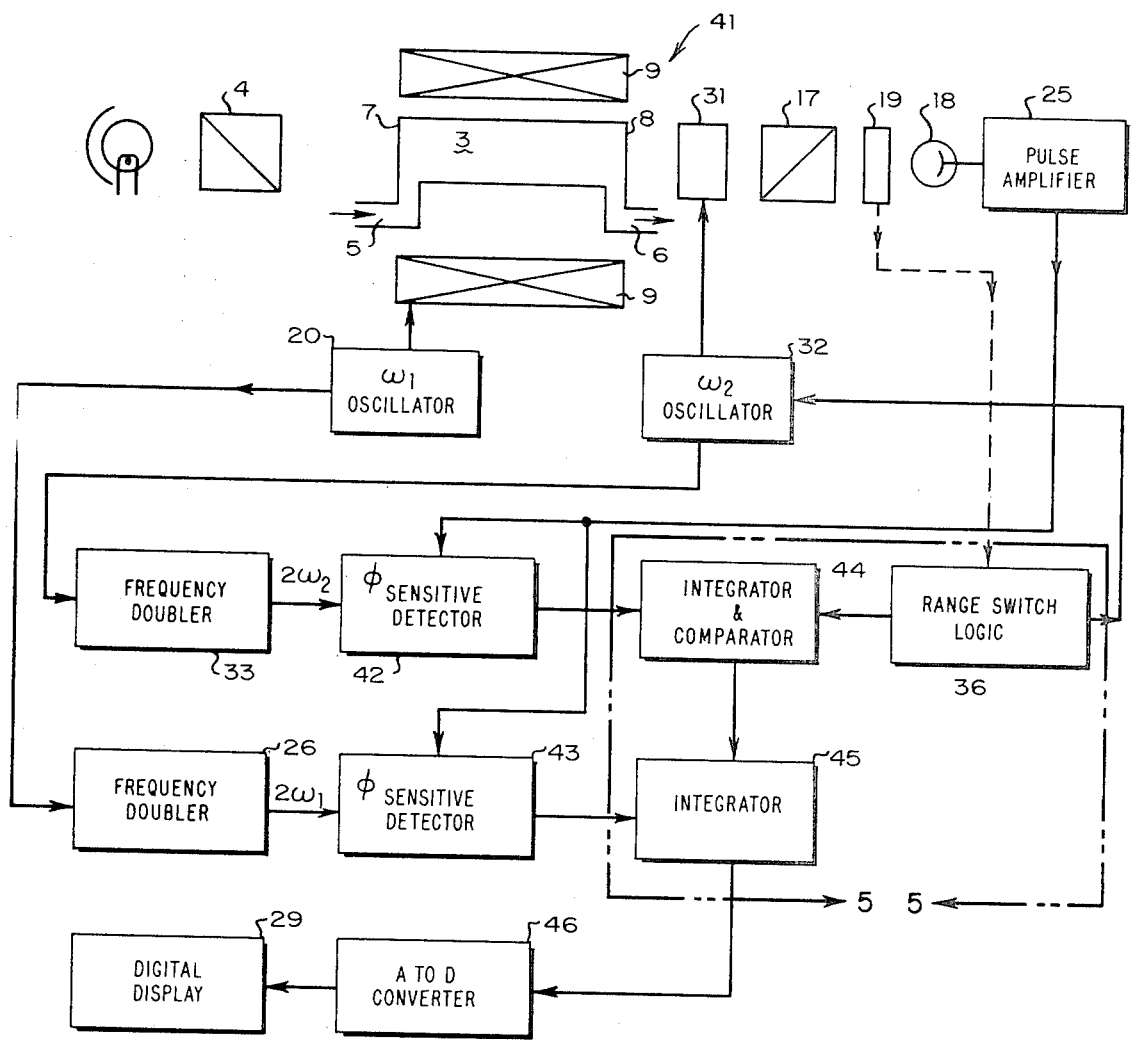
FIG. 4 is a schematic line diagram, partly in block diagram form, for a magneto-optic rotation analyzer incorporating alternative features of the present invention.

Referring now to FIG. 4, there is shown a magneto-optic rotation analyzer 41 incorporating alternative features of the present invention. The analyzer 41 of FIG. 4 is essentially identical to that previously described with regard to FIG. 1 with the exception that the mode of synchronous detection of the modulation component in the composite signal in the output of the pulse amplifier 25 is changed from that of a decade counter to that of phase sensitive detection. More particularly, phase sensitive detectors 42 and 43 are substituted for decade counters 34 and 27, respectively. The output of each of the phase sensitive detectors 42 and 43 is a DC signal corresponding to the separated reference signal and separated magneto-optic rotation signal, respectively. These signals are fed to respective integrators 44 and 45 for integration thereof. Integrator 44, which is connected to the output of the reference phase sensitive detector 42, includes a comparator therein which compares the integrated output with the output of the range switch logic 36 to derive the control signal fed to integrator 45 for transferring the output of integrator 45 to an analog-to-digital converter and thence to digital display 29. When the output of the integrator 45 has been transferred to the converter 46 and display 29, the outputs of the integrators 44 and 45 are discharged and the integration cycle for both the reference channel and the magneto-optic rotation channel is restarted.

Figure 5:
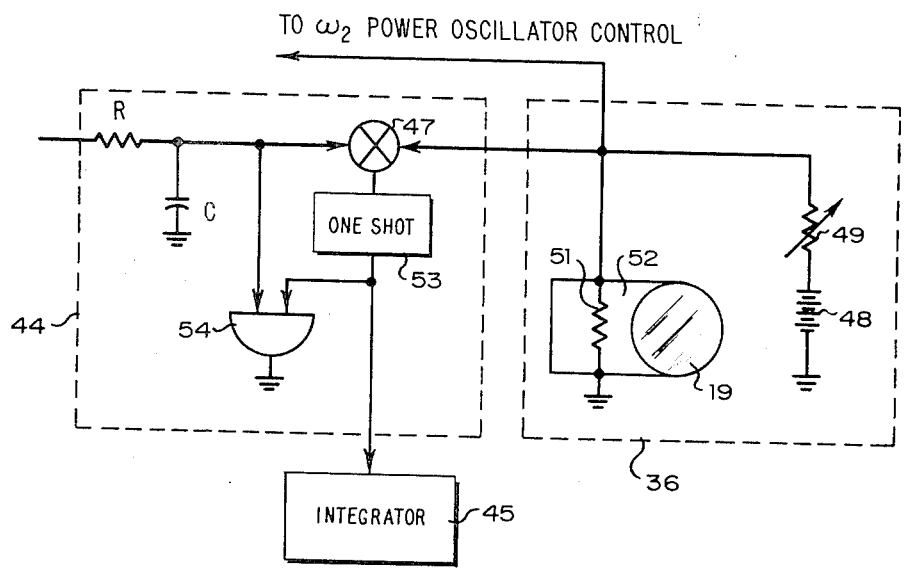
FIG. 5 is a schematic circuit diagram for portions of the circuit of FIG. 4 delineated by line 5—5.

Referring now to FIG. 5, there is shown, in schematic circuit diagram form, that portion of the circuit of FIG. 4 delineated by line 5—5. The reference channel integrator 44 includes series resistance R and shunt capacitance C. The integrated voltage developed across capacitor C is fed to one input of a comparator 47 for comparison with an output derived from the range switch logic 36. The range switch logic 36 includes a source of potential 48 and a series connected variable resistor 51 affixed to a frame 52 which supports the optical filter 19 and which is movable and replaceable with the filter 19. The resistor 51 is plugged into the circuit of the range switch logic 36 such that the potential divided across resistors 49 and 51 as applied to the input of the comparator 47 varies in accordance with the bandpass characteristics of the particular optical filter 19 which is inserted into the analyzer 41.

Thus, resistor 49 may be set to a value of resistance corresponding to a predicted concentration range of the constituent to be detected and resistor 51 is selected in accordance with the spectral bandpass of filter 19, such that the voltage applied to the comparator 47 from the range switch logic 36 is optimum for the desired length of integration of the magneto-optic rotation signal as derived from the output of phase sensitive detector 43, in the case of the analyzer 41, or the output of the signal counter 27, in the system 1 of FIG. 1.

When the output of the integrator 44 for the reference channel reaches the reference level, as set by the input to the comparator 47, the output of the comparator shifts from one condition to another and fires a one-shot multivibrator 53 which in turn causes the output of the signal channel integrator 45 to be applied to the analog-to-digital converter 46 and to restart the integration cycle. Another output of the one-shot multivibrator 53 also fires an AND gate 54 to discharge the reference channel integrator such that a new integration cycle is initiated in the reference channel. An output derived from the reference side of the comparator 47 is also fed to the power control for the $\omega_2$ reference oscillator 32 for controlling the modulation index of the rotation modulator 31.

Since many changes could be made in the above construction and many apparently widely different embodiments of this invention could be made without departing from the scope thereof, it is intended that all matter contained in the above description are shown in the accompanying drawings shall be interpreted and illustrative and not in a limiting sense.

I claim:

1. In a method for analyzing a sample by detection of magneto-optic rotation, the steps of, probing a sample of matter to be analyzed with a probing light beam having light of a first polarization, applying a magnetic field to the sample with a substantial component of the field being directed along the path of the light beam in the sample to produce magneto-optic rotation of the polarization of the light from the first polarization to a second polarization, modulating the magneto-optic rotation of the polarization at a first modulation frequency to produce a time varying magneto-optic rotation signal of a frequency which is a multiple of the first modulation frequency, modulating the rotation of the polarization of the light beam independently of the magneto-optic rotation at a second modulation frequency to produce a reference signal of a reference frequency which is a multiple of the second modulation frequency, analyzing the polarization of the light beam emerging from the sample as affected by the sample to separate the light of the first polarization from the light of the second polarization, detecting the separated light of one of said polarizations to produce a composite electrical signal having a magneto-optic rotation signal component of a frequency which is a multiple of the first modulation frequency and a reference signal component of a frequency which is a multiple of the second modulation frequency, separating and integrating the magneto-optic rotation signal component of the composite signal, separating the reference signal component from the composite electrical signal, integrating the magneto-optic rotation signal for a time interval which is responsive to the reference signal, and measuring the integrated magneto-optic rotation signal to obtain a measure of the concentration of preselected constituents of the sample.

2. The method of claim 1 wherein the probing light beam has a first optical bandwidth and including the step of, filtering the light beam as detected by the optical detector to a bandpass of optical frequencies encompassing substantially only the magneto-optic rotation spectrum of the sample constituent to be detected.

3. The method of claim 2 including the step of, substituting different optical filters having differing optical bandpass frequency ranges for detecting different sample constituents having different magneto-optic rotation spectra.

4. The method of claim 1 wherein the step of integrating the magneto-optic rotation signal for a time interval which is responsive to the reference signal includes the steps of, establishing a reference level signal whose magnitude depends on the intensity of the detected light, integrating the reference signal until the integral thereof reaches a level determined by the reference level signal, and employing the integrated reference signal to terminate the integration of the magneto-optic rotation signal.

5. In a magneto-optic rotation analyzer, means for probing a sample of matter to be analyzed with a polarized light beam of a first polarization, means for applying a magnetic field to the sample with a substantial component of the field being directed along the light path in the sample to produce magneto-optic rotation of the polarization of the light from the first polarization to a second polarization, means for modulating the magneto-optic rotation of the polarization at a first modulation frequency to produce a time varying magneto-optic rotation signal of a frequency which is a multiple of the first modulation frequency, means for modulating the rotation of the polarization of the light beam independently of the magneto-optic rotation at a second modulation frequency to produce a reference electrical signal of a reference frequency which is a multiple of the second modulation frequency, means for analyzing the polarization of the light beam emerging from the sample as effected by the sample to separate the light of the first polarization from the light of the second polarization, means for detecting the separated light of one of said polarizations to produce a composite electrical signal having a magneto-optic rotation signal component of a frequency which is a multiple of the first modulation frequency and a reference signal component of a frequency which is a multiple of the second modulation frequency, means for separating the magneto-optic rotation signal component and the reference signal component from the composite electrical signal, means for integrating the magneto-optic rotation signal for a time interval which is responsive to the reference signal, and means for measuring the integrated magneto-optic rotation signal to obtain a measure of the concentration of preselected constituents of the sample.

6. The apparatus of claim 5 wherein the probing light beam has a first optical bandwidth and including, means for filtering the light beam passed to said optical detecting means to a bandpass of optical frequencies encompassing substantially only the magneto-optic rotation spectrum of the sample constituent to be detected.

7. The apparatus of claim 6 including means carried from said filter means for establishing a reference signal level for comparing against the reference signal to derive a comparator output, and said compensating means being responsive to the output of said comparator to compensate the measurement of the magneto-optic rotation signal.

8. The apparatus of claim 5 wherein the means for integrating the magneto-optic rotation signal for a time interval which is responsive to the reference signal includes means for establishing a reference level signal whose magnitude depends on the intensity of the detected light, means for integrating the reference signal, means for comparing the integrated reference signal with the reference level signal to produce an output signal when the integrated reference signal reaches the reference level, means responsive to the output signal for terminating the integration period of the magneto-optic rotation signal, and means for measuring the integrated magneto-optic rotation signal.

* * * * *

UNITED STATES PATENT OFFICE
CERTIFICATE OF CORRECTION

Patent No. 3,738,756      Dated June 12, 1973

Inventor(s)   Robert L. Chaney

It is certified that error appears in the above-identified patent and that said Letters Patent are hereby corrected as shown below:

Column 4, line 6, delete "counter";

Column 4, line 45, cancel "Oreg." and substitute -- Oregon --;

Column 7, line 5, cancel "are" and substitute -- or --.

Signed and sealed this 20th day of November 1973.

(SEAL)
Attest:

EDWARD M. FLETCHER, JR.      RENE D. TEGTMEYER
Attesting Officer      Acting Commissioner of Patents